United States Patent [19]

Dinapoli et al.

[11] 3,754,122

[45] Aug. 21, 1973

[54] MILEAGE RECORDING

[75] Inventors: Nicholas Dinapoli; Donald Friedman; Robin P. Nicholls; Howard A. Wilcox, all of Santa Barbara; Charles E. Wood, Porterville, all of Calif.

[73] Assignee: Minicars, Inc., Goleta, Calif.

[22] Filed: Jan. 24, 1972

[21] Appl. No.: 220,384

Related U.S. Application Data

[62] Division of Ser. No. 44,055, June 8, 1970, Pat. No. 3,665,397.

[52] U.S. Cl............ 235/92 DN, 235/97, 235/92 NT, 235/92 R, 324/94, 73/490
[51] Int. Cl............................................. G01c 22/02
[58] Field of Search..................... 324/94; 73/490; 235/95 R, 92 DN, 92 NT, 92 TC, 61.7 B, 61.8 A, 97; 340/149 A; 328/127

[56] References Cited
UNITED STATES PATENTS
3,500,342   3/1970   Bissett et al. ........................ 324/94

*Primary Examiner*—Maynard R. Wilbur
*Assistant Examiner*—Joseph M. Thesz, Jr.
*Attorney*—Christie, Parker & Hale

[57] ABSTRACT

An automatic automobile rental system having a plurality of remote rental stations and a central data processing station for system control and customer billing is described. A system user employs a credit card that is automatically read at a rental station to identify the user, and this information is checked at the central station to verify that the card holder is entitled to receive an automobile. The same card identifies the holder when the automobile is returned to the same or a different rental station. An ignition key and machine-readable car identification and mileage module are interconnected for reading and dispensing at a rental station and for use in operating an automobile. Mileage or other measure of usage of the rented automobile is recorded in an electrolytic cell as a state of charge proportional to mileage. The cell is transferred to the automobile for mileage recording and to the rental station for discharge and mileage reading. Standard pulses of charge in a number proportional to milegage are used to charge the electrolytic cell. Data read from the electrolytic cell, from the user card, and from the automobile identification are transmitted to the central data processing unit over conventional telephone lines.

3 Claims, 4 Drawing Figures

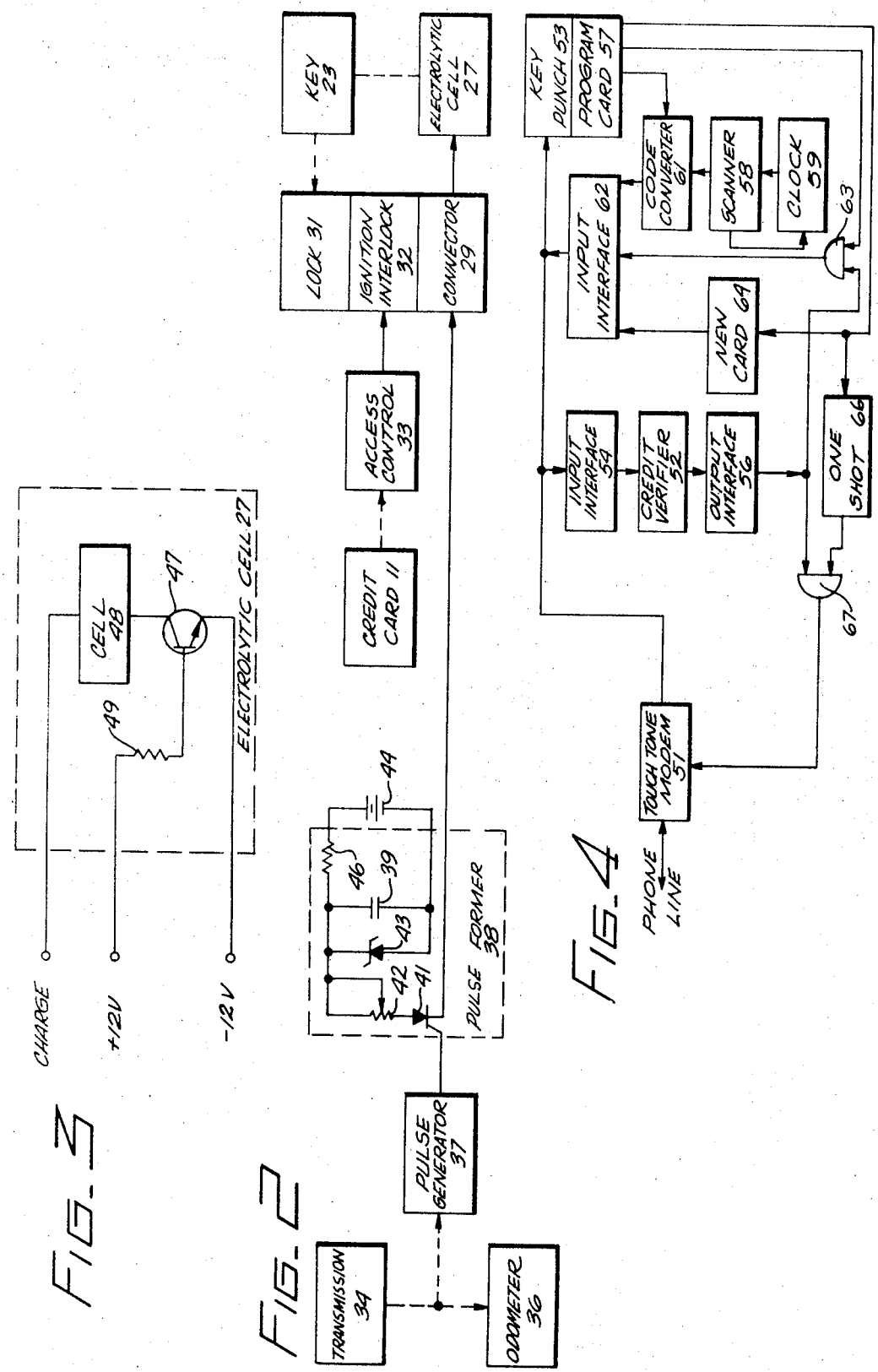

MILEAGE RECORDING

CROSS REFERENCE TO RELATED APPLICATIONS

This is a division, of application Ser. No. 44,055, filed June 8, 1970 now U.S. Pat. No. 3,665,397.

BACKGROUND

This application involves an improvement on the invention described and claimed in copending patent application Ser. No. 44,056, entitled "Vehicle Shared Use System" by Manfred Altman and Donald Friedman, now U.S. Pat. 3,624,608.

A substantial network of automobile and other vehicle rental facilities has been developed in this country, such as, for example, at airports and other locales where a large number of automobiles can be rented. Personnel are required at each of these stations in order to transact business, and record rental information for subsequent billing. Because of the personnel required to operate a rental station, a substantial rental business must be available before the cost is justified. In smaller stations, the personnel may have other duties, but it is always necessary that personnel be available for manning the station.

It is, therefore, desirable to reduce the manpower required for automobile rental both in large stations having a substantial volume of business and also in small stations having a small volume of business.

With an automatic automobile rental system available that does not require continual presence of an operator, the number of stations can be increased and substantial savings made to the public in decreasing the requirements for additional automobiles. Thus, for example, in a large apartment complex, the ready availability of rental cars can substantially reduce of number Of "second" cars used by the families in the complex. Most second cars in a family are used only intermittently, and if a rental car were conveniently available whenever needed, many second cars could be dispensed with, thereby reducing capital investment and alleviating automobile storage problems.

It is, therefore, desirable to provide an automobile rental system capable of operating automatically without continual personal attention.

An automatic automobile rental system should be capable of accepting the many types of automobiles available, of both foreign and domestic manufacture, and should accept these automobiles in the system with only minor and inexpensive modification.

BRIEF SUMMARY OF THE INVENTION

Thus, in practice of this invention according to a preferred embodiment there is provided analog means for recording vehicle mileage for remote readout comprising a pulser in parallel with the vehicle odometer for generating a number of pulses in direct proportion to mileage and means for charging an electrolytic cell for recording the total electric charge of the pulses. Means are included for preventing accidental discharge of the electrolytic cell so that it can be removed from the vehicle and the charge read remotely from the vehicle for determining mileage.

DRAWINGS

These and other features and advantages of the present invention will be appreciated as the same becomes better understood by reference to the following detailed description of a presently preferred embodiment when considered in connection with the accompanying drawings wherein:

FIG. 2 illustrates in block form a means for ascertaining mileage in the system of FIG. 1.

FIG. 3 illustrates an electrolytic cell for temporarily recording mileage.

FIG. 4 illustrates in block diagram form a typical central processing unit.

DESCRIPTION

Figure 1:
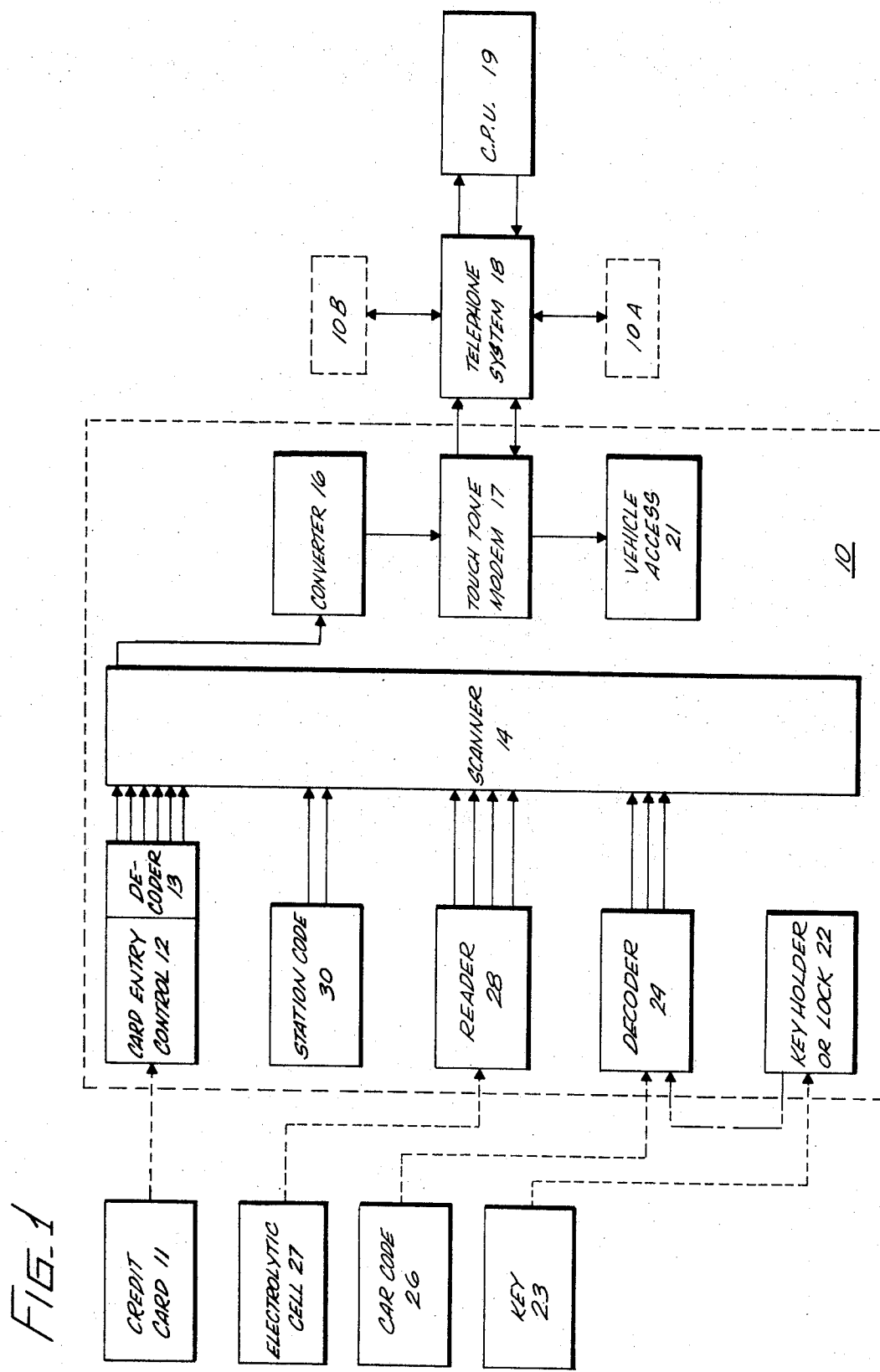
FIG. 1 illustrates in block diagram form an automatic automobile rental system constructed according to principles of this invention.

FIG. 1 illustrates in block diagram form one rental station 10 or key vending machine in an automatic vehicle rental system. As illustrated in this embodiment, access to an automobile or other vehicle is in part controlled by a credit card 11 that is issued to a potential user of the system. The credit card can be any of a variety of conventional machine-readable cards or similar devices by means of which coded information identifying a user can be conveyed. The information can be embossed on a plastic card or in the form of perforations, magnetic regions or other machine-readable indicia, many types of which are well known in the art.

It is particularly preferred, however, to employ a hybrid machine-readable card having a first simple magnetic code for controlling entry of a card into the apparatus at a car rental station. Information identifying a particular user of the card is preferably coded as a plurality of perforations in the card. The hole coded information is serially after the magnetic entry code. In use, the card 11 is inserted into a card entry control 12 which is an inexpensive reader for magnetic coding on the card. If the code on the card corresponds to a preselected code, a blocking mechanism is released which permits entry of the card into a decoder 13. If the magnetic code does not match, the card cannot be further inserted. The hole decoder 13 is preferably a simple electromechanical reader for a card having a plurality of perforations. Separate magnetic readers and hole readers for credit cards or the like are well known in the art, however, it is preferred for reasons of economy to combine the two into a hybrid reader combining the entry control and information decoding.

The card entry control 12 effectively comprises a switch or mechanical interlock that prevents entry of the credit card 11 into the decoder 13 if the magnetic information coded on the card is different from a selected code. Entry of the card into the decoder 13 is permitted if the magnetic code on the card is the same as a preselected code. By providing a simple and inexpensive card entry control, the acceptable code of which can be readily changed, access to the automatic vehicle rental system is readily controlled on a periodic basis.

Thus, the qualified users of the system are issued a card having a selected magnetic code and the card entry control reader at each rental station is set to accept that code. At the end of a selected period, say, for example, one or three months, the user is issued a replacement card with a new code and the card entry control is reset to accept cards having the new code. In order to prevent inconvenience to users, provision is made in the card entry control 12 for temporily accepting two codes at the time of changing from one code to another. Within a relatively short time interval the card entry controls for the several stations in the overall system can be converted to a new code so that obsolete and unauthorized credit cards cannot be used.

After the card entry control 12 has permitted a credit card to enter the decoder 13, the coded information on the card in the form of holes is read by the decoder to identify the user. The decoder is preferably one for electromechanically reading the holes in a credit card, and the arrangement of holes uniquely identifies an individual system user. The decoder 13 preferably has a decimal output and six digits are considered sufficient for practical purposes since this provides identification for up to one million users. The hybrid card is advantageous since the simple magnetic code for entry and more complex hole code for identification can be read with the most inexpensive combination of readers, and the card is significantly more difficult to counterfeit.

It will be recognized, of course, that the card reader merely identifies the card and not the user directly since this machine is incapable of distinguishing an authorized card holder from someone having the card without authority. In order to avoid such unauthorized use of a credit card, the vending station can also be provided with a simple input coding arrangement for use by the authorized card holder. Thus, for example, a series of numbered or lettered push buttons can be provided that are pushed by the customer in a specially coded sequence known to that customer before the credit verifier hereinafter described will permit the operator to use the vehicle. Other arrangements such as voice print recognition or other devices for recognizing some uniquely personal feature of a customer can be included along with the card reader for enabling operation of the system only when an authorized user presents a card.

A multiple key input in combination with the credit card may also be useful in enabling the system to meet varying legal requirements in selected states whose present laws require checks on the identity of the driver, current validity of his driver's license, his state of sobriety and his driving competency before a vehicle can be rented to him. The voluntary act of the potential customer in punching his unique code into the system can be employed as a certificate by the customer that he qualifies to the legal requirements of the state. A printed statement may be provided at the station where car keys are dispensed labeled with some certificate, such as, "I hereby certify that I have a legal right to possession of the credit card now inserted in this machine, that I have a currently valid driver's license, that I am legally sober, that I intend to be the driver of the car I am now acquiring, and that I am now competent to drive an automobile", or some other wording suitable for satisfying the legal requirements of the local jurisdiction.

Further along this same line, the automatic rental station may include equipment for providing a simple driver competency test. Such a test might, for example, require the customer to insert a long rod into a deep hole to touch the bottom without first touching the sides, thus showing quality of eyesight, steadiness of hand, etc. Breath sampling instrumentation could also be incorporated for determining blood alcohol concentration by breath analysis in a sobrietY screening test. Many other arrangements for identifying a user and establishing his competency to rent a vehicle from the system can, of course, be provided.

Referring again to FIG. 1, the six digit decimal output of the card decoder 13 is connected to a scanner 14 which sequentially scans the six digits and other decimal inputs hereinafter described. The coded information from the scanner 14 is applied sequentially to a converter 16 which converts each decimal digit to an octal code, thus each decimal digit which is one of ten possible digits is converted to two out of eight possible digits. These digits are applied sequentially to a conventional touch tone modem 17 or modulator-demodulator which converts the coded digits to a train of signals of selected frequency such as are readily transmitted over conventional telephone lines 18. Both the one of ten to two of eight converter 16 and touch tone modem 17 are conventional items commonly employed in telephone systems for transmitting decimal information over telephone lines.

The train of signals is transmitted by way of the telephone custom 18 to a central processing unit 19 in the form of a central station having manual and automatic equipment for verification of credit, recording of users, vehicles, mileage, and the like, and preferably automatic billing provisions. The telephone lines 18 also communicate with a plurality of similar remote vehicle rental stations 10A, 10B, etc., a large number of which may be serviced by a single central processing unit. Each of the additional rental stations is substantially similar to the station 10 herein described, and collectively the stations serve a large area and number of locations in an automatic vehicle rental system.

The telephone system 18 preferably includes a conventional concentrator (not shown) for coupling the plurality of remote rental stations or vending machines 10 to a single central processing unit in a selected district. The concentrator includes a line controller that operates a switch mechanism, such that the first rental station to have all of the necessary information and request access to the central processing unit is the first connected. The next request from a station stands second in line to be connected to the central processing unit and so on. The central processing unit accepts and records only one station's information at any one time; however, because the communication is between electronic systems, the system can cover many communication requests in a short period of time. Once a telephone line request has been made the concentrator connects the remote station to the central processing unit in less than a minute, even on a busy day.

If the central processing unit 19 verifies either by manual or automatic means that the credit card 11 inserted in the decoder 13 entitles the user to rent a vehicle, a signal is sent back to the station 10 over the telephone line 18 as touch tones which are demodulated by the touch tone modem 17 and applied to a vehicle access control 21. The vehicle access control may merely be a door or gate permitting the vehicle to leave a controlled area or is preferably a door to a compartment within which the ignition key 23 to a vehicle is stored. If the key is stored in a lock-type receptacle, that is, a key holder or lock 22, the vehicle access control may unlock the receptacle so as to permit the key to be withdrawn.

If the central processing unit finds for some reason that the user is not entitled to a vehicle, key access is denied and some type of rejection signal is given to the potential user. It is desirable to provide a direct telephone communication between the remote station and an operator at the central processing unit so that a "rejected" user can contact the central station for personal rather than machine-to-machine communication. Such a telephone connection is conventional, operates in parallel with the described automatic rental system and is not further described or illustrated herein.

In the illustrated embodiment a lock 22 is provided for receiving a key 23 which is the conventional ignition key for a vehicle. The lock 22 may be either a mere dummy key holder providing a storage and dispensing means for the key, or may operate a switch, or may be coupled to a decoder 24 for identifying the specific car with which the key is associated. For this purpose, a car code 26 is read by the decoder 24. The car code may be associated with the conventional high and low places on a key for actuating the lock tumblers in which case the decoder 24 is a switch coupled to the conventional lock tumbler mechanism. If desired the car code 26 can be in the form of auxiliary notches on the key which can be read by an electromechanical reader. The car code 26 is in some manner coupled mechanically to the ignition key 23.

The key and car code are also mechanically coupled to an electrolytic cell 27 employed for recording vehicle mileage, or other usage, as hereinafter described. The electrolytic cell 27 is detachably connected to a cell reader 28 forming a part of the car rental station. The cell reader 28 is a conventional coulometer for measuring the state of electrical charge of the electrolytic cell 27. In operation, the electrolytic cell has no stored charge at the time the vehicle is rented from the rental station, and during use of the vehicle, the state of charge is increased in direct proportion to the mileage of the vehicle. Upon returning the car to the rental station, the reader 28 determines the new state of charge of the cell and also discharges it for the next use. The state of charge of the cell is read out as a four digit decimal code applied to the scanner 14.

Although it is preferred to employ mileage as a measure of vehicle usage since this is most easily correlated with present rental systems, it will be understood that other measures of vehicle usage can be employed. Thus, for example, the total number of engine revolutions could just as easily be employed. If desired, some combination of measures of usage, such as, engine revolutions, wheel revolutions, rate of change of these revolutions, number and magnitudes of car accelerations, total fuel consumption, total ingested air in the engine, or some other measure of usage, including a wholly arbitrary one, can be employed if desired.

The car identification ascertained by the decoder 24 is applied to the scanner 14 as a three digit decimal code. The scanner 14 scans the signals from the credit card decoder 13, mileage reader 28, and car code decoder 24 in sequence for transmission to the central processing unit 19. At the time a vehicle is rented the credit card holder is associated with the particular vehicle, a time signal (not shown) is recorded for billing on the basis of the number of hours the vehicle is used, and also the beginning mileage of the vehicle is recorded (that is, zero in the illustrated embodiment). This data is recorded at the central processing unit at the time that the vehicle key 23 and electrolytic cell 27 are released by the vehicle access control 21 so that the user can have access to the vehicle. A station identification signal 30 is also applied to the scanner so that the central processing unit recognizes the rental station making the call.

After the use is completed the vehicle is returned to a rental station 10 and the key 23 inserted in the key holder or lock 22 and the electrolytic cell 27 is inserted in the cell reader 28. It is preferred that the credit card 11 also be inserted in the decoder 13 to verify usage by a qualified user; however, this is not necessary since the identification of the user having a particular card can be stored in the central processing unit in association with the particular vehicle.

The car identification decoder 24 reads the car code 26 which is mechanically coupled to the key 23 and to the electrolytic cell 27. The cell reader 28 discharges the electrolytic cell and measures the quantity of electricity required to completely discharge the cell, which provides a direct measure of the mileage the vehicle has used between the time it was taken from the station and returned. These several bits of data are read by the scanner 14 and conveyed to the central processing unit 19 where they are processed for billing the user according to the time that he had access to the vehicle and the total mileage the vehicle was used.

FIG. 2 illustrates in block diagram form the equipment associated with a vehicle in an automatic rental system as provided in the practice of this invention. The electrolytic cell 27 is plugged into a connector 29 on the vehicle adjacent the conventional ignition lock 31 which is operated by the key 23 in the conventional manner. It is most convenient to have the connector 29 adjacent the ignition lock 31 since the key and electrolytic cell are mechanically coupled together, preferably by a short chain or the like. Both the connector 29 and ignition lock 31 are connected to an ignition interlock 32 so that all elements of the system have to be connected to the vehicle before it can be operated. Also connected to the ignition interlock 32 can be an access control switch 33 controlled by the credit card 11 of the user in the same manner as the card entry control 12. Clearly, this is redundant with the card access control at the rental station; however, it may be desirable in some circumstances to minimize the possibility of unauthorized vehicle usage.

In a conventional automobile or similar vehicle the transmission 34 is mechanically coupled to an odometer 36 for recording the mileage the vehicle has traveled. In modifying the vehicle for use in the automatic rental system, a pulse generator 37 is mechanically connected in parallel with the odometer 36 for generating a single pulse at selected increments of mileage, such as, for example, one pulse at each mile or tenth of mile of travel. The pulse generator 37 is preferably a simple cam operated switch providing one switch closure pulse upon each revolution of the cam. The cam may be associated with one of the conventional odometer wheels, or is preferably an additional speed reducer coupled to the switch operating cam. This latter arrangement permits simple modification of the vehicle by addition of the pulse generator in the cable from the transmission to the odometer without entering the odometer mechanism itself. If desired, pulses coupled to the engine ignition can be used so that the measure made is of engine revolutions rather than mileage traveled.

The pulse generator 37 is connected to a pulse former 38 which produces an output pulse in response to each input pulse from the pulse generator. The output pulse from the pulse former has a controlled current flowing for a controlled time so that the number of coulombs of electricity contained in each pulse is constant. These pulses are applied through the connector 29 to the electrolytic cell 27 and thereby increase the charge in the electrolytic cell. Since the charge in each pulse is the same, the total charge accumulated by the electrolytic cell 27 is directly proportional to the mileage the vehicle is used. It should be noted that the pulse former 38, electrolytic cell 27, and cell reader 28 are all commercially available units which can readily be adapted for use in an automatic automobile rental system. A suitable electrolytic cell and cell reader are, for example, available from the Bissett-Berman Company.

The pulse former 38 produces an output pulse having a predetermined charge from a capacitor 39. The input trigger signal from the pulse generator 37 is applied to a silicon control rectifier 41 which is thereby made conductive by each pulse so that the capacitor 39 discharges through a variable resistor 42 into the electrolytic cell 27. The variable resistor 42 is for factory trimming the system and is not normally adjusted during use. The charge on the capacitor 39 is determined by the voltage from a zener diode 43 connected across the vehicle battery 44 by way of a resistor 46. The resistor 46 is chosen so that the current flow is less than the holding current of the silicon controlled rectifier 41 so that it cuts off immediately after discharge of the capacitor 39. The magnitude of charge applied to the electrolytic cell is determined by the zener voltage and the value of the capacitor. The amount of charge transferred from the capacitor to the electrolytic cell is adjusted by the setting of the variable resistor 42.

Unless some precaution is taken the electrolytic cell 27 carrying an electric charge may be partly discharged by shorting out the electrical leads thereto when the cell is not connected to a vehicle. Such accidental or deliberate discharge would remove some of the stored charge in the electrolytic cell and thus give an inaccurate vehicle mileage readout at the rental station. In order to circumvent this possibility, a switching transistor 47 is connected in series with the actual charge storage cell 48, as illustrated in FIG. 3. The base of the transistor 47 is connected by way of a resistor 49 to the vehicle battery voltage. The transistor thus allows the cell 48 to charge or discharge when the 12-volt potential is placed between the base and emitter of the transistor. Such potential switches the transistor and allows current to flow through the cell. If the potential across the transistor is removed, the transistor switches off and does not allow the cell to charge or discharge. Thus, any attempt to discharge the cell merely by shorting the leads will fail.

If desired, an inexpensive microphone-filter or accelerometer system (not illustrated) can be installed in each vehicle for generating a signal whenever a car is subjected to an impact so that potential damage can be identified and correlated with a user having access to the vehicle at that particular time. Such a signal can be, for example, stored in the vehicle for intermittent reading in case damage is noted, or the signal may be employed to set a logic element associated with the electrolytic cell to alert the central station of possible damage to a vehicle when it is returned to the station.

FIG. 4 illustrates in block diagram form a typical central processing unit 19 for substantially completely mechanized operation. It will be apparent that greater or lesser degrees of mechanization can be employed as desired. As illustrated in this embodiment, a signal transmitted over conventional telephone lines is first applied to a touch tone modem 51, partial function of which is to convert touch tone information into switch closure information suitable for application to a credit verifier 52 and a conventional automatic keypunch machine 53. The keypunch machine is designed to receive information directly from the modem 51 and record it by means of standard punch cards. It will be apparent, of course, that punch or magnetic tape or other data storage techniques can be employed as desired.

The credit verifier 52 is a conventional apparatus commercially available in a unit employing binary code. Therefore, an input interface 54 and output interface 56 are provided for converting the decimal information to a suitable format for use by the credit verifier. The credit verifier 52 is responsive only to the first six decimal digits presented to it in each data transmission sequence. This number is compared with a list of internally stored numbers in the credit verifier. In its usual form, the credit verifier stores numbers corresponding to potential users having "bad credit" so if a match is found, the credit verifier provides a "bad credit" signal at the output, while if a match is not found the credit verifier provides a "good credit" signal at its output. Clearly, the reverse, namely good credit risks, can be stored in the credit verifier if desired for providing acceptance or rejection signals.

While the credit verifier 52 is making comparison with the stored numbers, decimal numbers continue to come in by way of the touch tone modem 51 and are applied to the keypunch mechanism 53. The number identifying the remote rental station, the vehicle identification number and the mileage numbers as read from the electrolytic cell arrive in any desired sequence and are sequentially punched on a program card 57 for recording, along with the digits identifying the user. Although the numerical values of the input members are variable, the digit length of each input is constant. The program card 57 signals as each digit of the remote station's information has been recorded, and this signal is applied to a scanner 58 for passing a pulse from a clock 59 to a code converter 61 and input interface 62 for cycling the keypunch 53. This cycle continues repetitively until all of the input digits have been recorded. The clock output is held constant by the scanner 58 during interrogation so that the several digits are sequentially punched. As soon as the final clock digit is punched, the program card 57 applies a signal to an AND gate 63, the other input of which is the output of the credit verifier 52. The output of the AND gate 63 is applied to the input interface 62 for application to the keypunch mechanism 53 so that the credit status of the credit card number is recorded.

As soon as the credit status has been punched by the keypunch 53, the final output conductor is energized by the program card 57 and a new punch card is called for by way of a new card command unit 64, which moves a new card into position in the keypunch 53 so that the program card output conductor terminals are all de-energized. The final output also energizes a one shot multivibrator 66 which remains energized for a sufficient time to permit an AND gate 67 to pass the credit response from the credit verifier 52 to the touch tone modem 51 for transmission to the remote rental station by way of the telephone line. This output credit signal permits or refuses access to vehicle keys to the user.

Thus, it will be seen that the user, station and vehicle identification, and vehicle mileage are recorded as the credit is verified, and after recording the credit status with this other information, the credit status is transmitted to the remote station. When the one shot circuit 66 de-energizes after a predetermined length of time, the AND gate 67 closes and the response information to the remote station is discontinued. The signal to the telephone system in effect tells the remote vehicle rental station to "hang up" so that another rental station connected to the telephone system can record its information and receive a credit response.

The automatic rental system can be in a relatively simpler form wherein a vehicle taken from a station is returned to the same station at the end of usage. In such an embodiment, the car decoder 24 can be a simple switch input operated by the lock 22 which is uniquely operated by the key of the particular vehicle.

It is preferred, however, that the automatic rental system be more versatile and permit the rental of the vehicle from one station and return to a different station remote from the first. Such arrangement is known as a "one-way" system. In this situation, the car mode may be more complex than the simple key tumbler arrangement for positively identifying a specific vehicle and a somewhat more complex decoder 24 is employed capable of accepting any key and identifying the vehicle associated with it. If desired, the car code can be provided in the same housing as the electrolytic cell rather than on the key. When it is possible to return the vehicle to a different station from which it was rented, a station identification signal 30 is also provided from the station 10 to the central processing unit 19 so that the location of vehicles available for rental can be recorded.

It will be apparent that the automatic vehicle rental station 10 is a relatively inexpensive arrangement readily adaptable to existing installations. Thus, it can take the form of an automatic vending machine at an existing parking lot or other location where vehicles are available. The vending machine need only have a credit card reader and a series of push buttons or other selector switches so that a potential user can select a desired vehicle for rental. These, plus a direct telephone to an operator at the central processing unit, and possibly a keypunch user identifier, need be the only controls available to a potential user. The only output to the user need be a light indicating a rejection of the request for vehicle rental such as, for example, if the user's credit is not verified, and an opening mechanism for each of a plurality of doors or other holding devices permitting access by the user to the ignition key and electrolytic cell needed for operation of a vehicle. The balance of the rental station equipment hereinabove described and illustrated can all be within a small automatic vending machine, which can be conveniently located in proximity to a place for storing a plurality of rental vehicles.

In an automatic rental system such as provided in practice of this invention, great versatility can be provided without large manpower requirements since the data concerning users, usage, and the like, is processed by a computer. The system can be programmed to provide much valuable information in addition to the billing to the customers. Thus, for example, the system can readily provide an early warning to an operator at the central processing unit of an impending emptiness of the parking lot at a particular remote rental station, thereby permitting movement of cars to that station to accommodate any demand. In the same line, an oversupply of cars in any station can readily be identified. The accumulated mileage or other usage of a vehicle can be recorded in order to alert maintenance crews to periodic maintenance requirements of vehicles. The computer is readily adapted to reservation of particular vehicles by potential users so that they can be assured of the availability of a pickup truck, luxury car, or other special requirement. A light on the vending machine and a centrally controlled hold on the key releasing mechanisms serve to alert other potential users that a vehicle is reserved and prevent the other users from having access to that vehicle. A variety of rental rate structures and rental priorities can also be provided by the central control system without any significant complexity.

Although limited embodiments of automatic vehicle rental system have been described and illustrated herein, many modifications and variations will be apparent to one skilled in the art. Thus, for example, the central processing unit may have a significant variation in complexity and equipment employed as the number of stations and vehicles in the system varies. With such differences in magnitude of the system, various degrees of manual and automatic control, data recording, billing and the like can be employed at the central processing unit. Many other modifications and variations will be apparent to one skilled in the art, and it is therefore to be understood that within the scope of the appended claims the invention may be practiced otherwise than as specifically described.

What is claimed is:

1. In an automatic vehicle rental system an improved combination of;

means for sensing vehicle mileage; means for generating digital signals proportional to mileage comprising:

means for generating pulses in direct proportion to mileage; and means for standardizing the electric charge of each pulse generated;

an electrolytic cell connected to the pulse generator for recording vehicle mileage as electric charge, said electrolytic cell being detachably connectable to the vehicle for recording mileage;

means for enabling vehicle operation when the electrolytic cell is connected to the vehicle and disabling vehicle operation when the electrolytic cell is disconnected; and means remote from the vehicle for reading the recorded electric charge and generating a digital signal in proportion thereto.

2. In a vehicle having an odometer, means in parallel with the odometer for recording mileage for removal to a remote mileage reader comprising:

pulsing means connected in parallel with the odometer for generating pulses, the number of pulses being in direct proportion to mileage of the vehicle;

pulse former means for forming each pulse from the pulsing means to have the same total electric charge;

an electrolytic cell removably connected to the pulse former means for recording the total electric charge;

means for preventing accidental discharge of the electrolytic cell;

and means for enabling vehicle operation only when the electrolytic cell is connected to the pulse former means.

3. Improved means for recording mileage as defined in claim 2 wherein the means for preventing accidental discharge comprises a voltage controlled normally open switch means in series with the electrolytic cell, the voltage controlled switch means permitting current to flow in the electrolytic cell only when a selected voltage is applied to the switch means.

* * * * *